United States Patent [19]
Bennett et al.

[11] 3,734,158
[45] May 22, 1973

[54] VALVE STEM ASSEMBLY FOR A TUBELESS TIRE RIM

[75] Inventors: Frank C. Bennett; Gerardus L. Felix, both of London, Ontario, Canada

[73] Assignee: General Motors Corporation, Detroit, Mich.

[22] Filed: Oct. 4, 1971

[21] Appl. No.: 186,034

[52] U.S. Cl............................................152/427
[51] Int. Cl............................................B60c 29/00
[58] Field of Search.................152/427, 428, 415, 152/429

[56] References Cited
UNITED STATES PATENTS 3,396,774   8/1968   Edwards et al.......................152/427
2,844,182   7/1958   Hall.......................................152/427
2,835,305   5/1958   Boyer....................................152/427

*Primary Examiner*—Gerald M. Forlenza
*Assistant Examiner*—Richard A. Bertsch
*Attorney*—J. L. Carpenter et al.

[57] ABSTRACT

A valve stem assembly for use with a vehicle rim which supports a tubeless pneumatic tire. The rim includes a cylindrical body portion having an outer face for supporting the tire and has a valve stem hole through which pressurized air is directed for inflating the tire. The valve stem assembly includes an adapter which is mounted to the inner face of the rim and includes externally accessible fasteners so that the adapter can be removed from the rim and rotated 180° without removing the tire from the rim.

2 Claims, 4 Drawing Figures

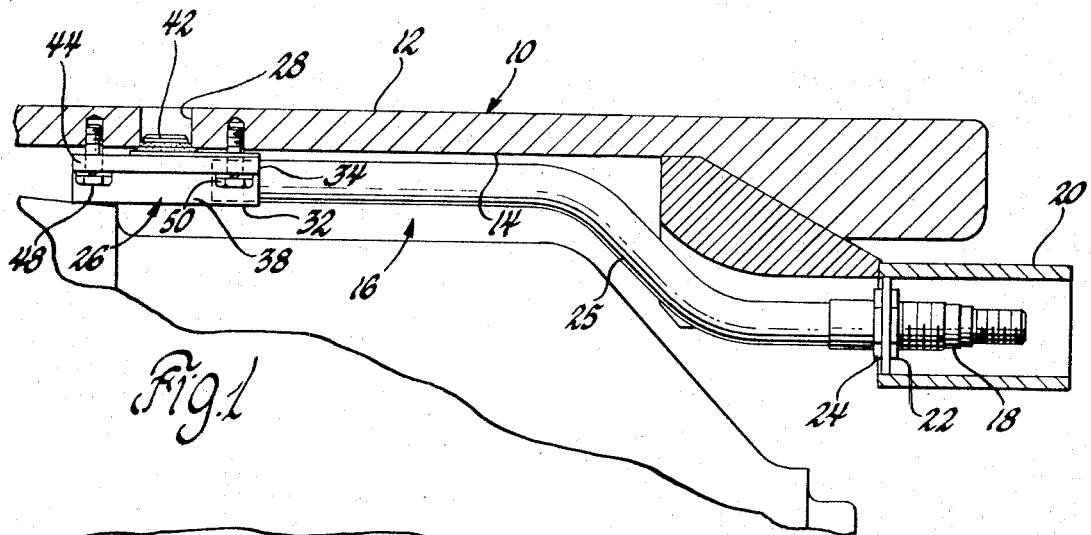
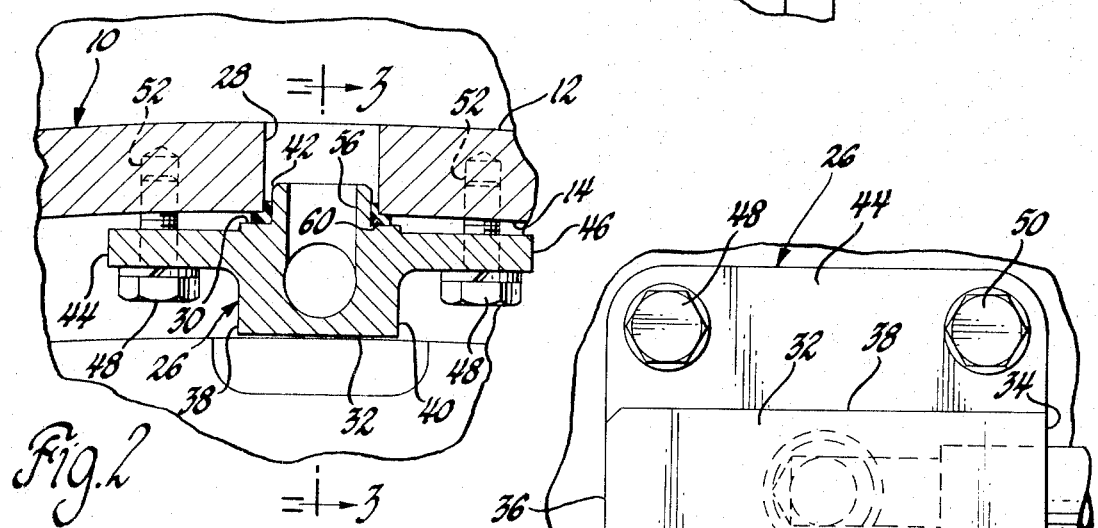
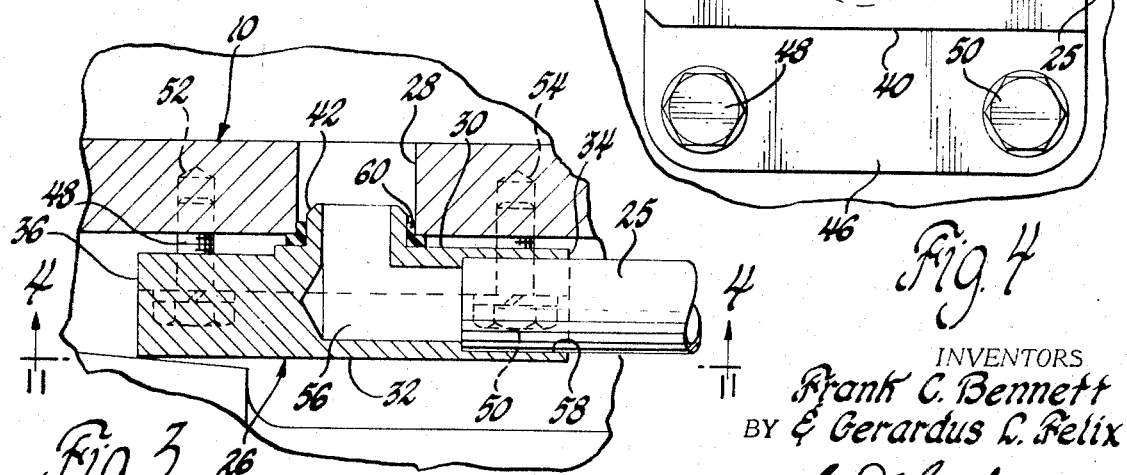

VALVE STEM ASSEMBLY FOR A TUBELESS TIRE RIM

The present invention concerns a valve stem assembly intended to be used with vehicle rims of the divided or split type which support tubeless pneumatic tires. Rims of this type are commonly used by heavy duty vehicles such as off-highway trucks and the like because the body of the tires designed for such service are stiff as compared to those for passenger vehicles.

Vehicle rims of the above-described type normally have pressurized air delivered to the supported tire through a long tubular valve stem, one end of which is accessible for connection with a source of pressurized air, while the other end is secured to the inner surface of the rim. An adapter having an air passage is used for securing the valve stem to the rim and is usually formed with a threaded head which extends through a valve stem hole in the rim and is held to the rim by a nut which engages the outer peripheral surface of the rim. One difficulty with an arrangement of this type is that the tire must be removed from the rim whenever a new valve stem is substituted for the old valve stem or when, in the case of dual tires, the inner tire is interchanged with the outer tire.

The present invention is intended to obviate difficulties associated with prior valve stem assemblies by providing an adapter which can be sealingly attached to the inner surface of the rim and fastened thereto without requiring removal of the tire. In the preferred form of the invention, the adapter is formed with a body that is generally rectangular in cross section and has a top surface, bottom surface, front and rear walls, and a pair of side walls. A head projects from the top surface of the body and is adapted to extend into the valve stem hole formed in the rim. A passageway is formed in the body so that pressurized air can flow therethrough with one end of the passageway opening at the head while the other end opens at the front wall. Each side wall is formed with a laterally extending support arm through which at least one threaded fastener member extends for securing the body to the inner surface of the rim. The fasteners are so located that the body can be rotated 180° about the center axis of the valve stem hole and be again secured to the rim by the fasteners.

The objects of the present invention are to provide a valve stem assembly for a vehicle rim that includes an adapter which can be rigidly connected to a tubular valve stem and can be secured to the inner surface of the rim without removing the tire; a tire rim and valve stem assembly for a tubeless tire in which the rim is formed with a valve stem hole which serves to accommodate an adapter that is held to the rim by externally accessible threaded fasteners; a valve stem adapter which is mountable to the inner surface of a tire rim and has externally accessible fasteners which are so positioned that the adapter can be rotated 180° and again be secured to the rim with the same fasteners.

Other objects and advantages of the present invention will be apparent from the following detailed description when taken with the drawings in which:

FIG. 1 is a cross-sectional view of a vehicle rim having a valve stem assembly made according to the invention;

FIG. 2 is an enlarged view of the adapter member which forms a part of this invention;

FIG. 3 is a sectional view taken on line 3—3 of FIG. 2 of the adapter member shown therein; and FIG. 4 is a plan view of the adapter taken on line 4—4 of FIG. 3.

Referring to the drawings, FIG. 1 shows a cross-sectional view of a vehicle rim 10 of the usual cylindrical form which is adapted to be fitted with a pneumatic tubeless tire (not shown) on the outer peripheral surface 12 thereof. As can be seen, the inner surface 14 of the rim 10 carries a valve stem assembly 16, the nipple end 18 of which extends into a cylindrical housing 20 on the edge of the rim 10 and is secured thereto by a pair of nuts 22 and 24 and a washer (not shown). As is conventional, the nipple end 18 of the valve stem assembly 16 is adapted to be connected with a source of pressurized air (not shown) which then flows through a bent tubular valve stem 25 to an adapter 26 located at the inner end of the valve stem assembly 16. The pressurized air exits from the adapter 26 and flows through a valve stem hole 28 formed in the rim 10 into the interior of the tire for inflating the latter.

The adapter 26 comprises a body portion which in cross section is rectangular in shape and is defined by a top surface 30, bottom surface 32, a front wall 34, rear wall 36, and side walls 38 and 40. A head 42 projects from the top surface 30 and is adapted to extend into the valve stem hole 28 as is shown in FIGS. 2 and 3. A pair of arms 44 and 46 extend laterally from the side walls 38 and 40 respectively, and each arm is provided with a pair of apertures which are adapted to receive threaded fasteners such as bolts 48 and 50 which respectively extend through the apertures into threaded bores 52 and 54 formed in the inner surface 14 of the rim 10. An L-shaped passageway 56 is formed in the body of the adapter 26 and serves as a conduit for the pressurized air flowing from the nipple end 18 to the valve stem hole 28. As seen in FIGS. 2 and 3, the passageway 56 extends through the head 42 and is formed with an enlarged bore 58 at the front wall 34 for rigidly accommodating the inner end of the valve stem 25. A ring type seal 60 which is L-shaped in cross section, surrounds the head 42 and is interposed between the top surface 30 of the body portion and the inner surface 14 of rim 10 for sealing valve stem hole 28.

From the above description it should be apparent that the valve stem assembly 16 made according to the invention can be fastened to the vehicle rim 10 without requiring the tire to be removed therefrom. This, of course, is possible because the fasteners are located on the inner surface 14 of rim 10 and are accessible without requiring the removal of the tire. In addition, it will be noted that the fasteners are so located that the adapter can be rotated 180° about the vertical axis of the valve stem hole 28 so that the nipple end 18 of the valve stem 25 can be located at the opposite side edge of the rim 10. Thus, in the case of dual tires, the inner tire can be interchanged with the outer tire and the valve stem assembly 16 quickly repositioned along the opposite edge of the rim without having to remove the tire from the rim.

Various changes and modifications can be made in this construction without departing from the spirit of the invention. Such changes and modifications are contemplated by the inventors and they do not wish to be limited except by the scope of the appended claims.

We claim:

1. A valve stem assembly for use with a vehicle rim having a valve stem opening and having an outer cylindrical surface for supporting a tubeless pneumatic tire and an inner cylindrical surface, said valve stem assembly comprising an adapter for attachment to the inner cylindrical surface of said rim, said adapter having a body formed with a pair of laterally extending arms, a head projecting centrally from said body and adapted to be located in said valve stem opening, said body having an L-shaped passageway formed therein with one end thereof extending through said head, a seal surrounding said head and interposed between said body and said valve stem opening for sealing the latter, a plurality of externally accessible fasteners extending through said arms and threadably received by the inner cylindrical surface of said base for securing said body to said rim, said fasteners being so located that said adapter can be removed from the rim and rotated 180° about the center axis of said opening and again secured by said fasteners to said rim, and an elongated valve stem rigidly attached to said adapter for communication with the other end of said passageway for supplying pressurized air to said tire.

2. A tire rim and valve assembly for a tubeless tire, said rim having an outer face for supporting the tire, an inner face, a valve stem hole provided in the rim, said valve stem assembly comprising a body having a generally rectangular cross section and being defined by a top surface, a bottom surface, front and rear walls, and a pair of side walls, a head portion projecting from said top surface and extending into said valve stem hole from the inner face of the rim, a seal surrounding said head portion and interposed between said inner face and said top surface, a tubular valve stem extension rigidly connected to said front wall of the body and extending laterally therefrom, said body being formed with a passageway extending through the head and communicating with the tubular valve stem extension, a laterally extending support arm connected to each of said side walls, said rim having a plurality of threaded bores formed in the inner face thereof, and threaded fasteners extending through each support arm into said bores for retaining said body on said rim and allowing said body to be rotated 180° about the center of the hole and be secured again to said rim by said threaded fasteners.

* * * * *